Sept. 13, 1960  E. R. CONOVER, JR  2,952,249
PNEUMATIC MOTOR
Filed Feb. 27, 1958  3 Sheets-Sheet 1

INVENTOR.
ERNEST R. CONOVER, JR.
BY
RICHEY, WATTS, EDGERTON,
McNENNY & FARRINGTON.
ATTORNEYS

Sept. 13, 1960   E. R. CONOVER, JR   2,952,249
PNEUMATIC MOTOR
Filed Feb. 27, 1958   3 Sheets-Sheet 2

INVENTOR.
ERNEST R. CONOVER, JR.
BY
RICHEY, WATTS, EDGERTON,
McNENNY & FARRINGTON.
ATTORNEYS

Sept. 13, 1960   E. R. CONOVER, JR   2,952,249
PNEUMATIC MOTOR
Filed Feb. 27, 1958   3 Sheets-Sheet 3

INVENTOR.
ERNEST R. CONOVER, JR.
BY
RICHEY, WATTS, EDGERTON,
McNENNY & FARRINGTON.
ATTORNEYS

United States Patent Office 2,952,249
Patented Sept. 13, 1960

2,952,249

PNEUMATIC MOTOR

Ernest R. Conover, Jr., Aurora, Ohio, assignor, by mesne assignments, to Master Power Corporation, Bedford, Ohio, a corporation of Maryland Filed Feb. 27, 1958, Ser. No. 718,031

10 Claims. (Cl. 121—84)

This invention relates to rotary motors of the type employing radially slidable blades mounted in a rotor and maintained in sealing relation with the motor wall by centrifugal thrust, and more particularly, the invention relates to magnetic means for securely maintaining the outer blade edges against the motor wall, such means being particularly adapted to be used on pneumatic motors, operating at relatively low speeds which do not provide ample centrifugal thrust force to securely seal the blade edges.

Pneumatic motors provide ideal wrenches, screwdrivers, and other power-driven tools, for the reason that relatively large amounts of power may be provided by a very small compact motor. It is known that pneumatic motors, having sliding blades maintained in sealing relation against the motor wall by centrifugal thrust alone, can be operated at peak efficiency only during those periods when the motor has attained sufficient speed to exert ample centrifugal thrust force against the blade edges.

In starting motors of this type it frequently happens that sufficient centrifugal thrust force is not developed at first to securely press the blades against the motor wall, and hence the motor operates at relatively low efficiency until sufficient centrifugal thrust of the blades is attained at increased motor speed. On relatively low speed motors, the problem of keeping the blades sealed against the motor wall may exist, even when such motors operate at top speed. Various efforts have been made to keep the blades sealed by admitting air to their inner edges and by other means.

Therefore, an object of this invention is to provide new and novel means for firmly pressing the outer edges of reciprocably mounted blades against the motor wall in pressure-sealing relation by means operating independently of the speed of the motor, said means being particularly adapted to be used on low speed motors, for providing blade sealing force comparable to the sealing force developed in motors operating at relatively higher speeds.

Another object of this invention is, to provide magnetic means for automatically and uniformly retaining the blade edges in pressure-sealing position against the motor wall at the time of starting the motor as well as after the motor is in full operation.

Other objects of this invention are to increase the operating efficiency of fluid-operated rotary motors having slidably mounted blades, by retaining the blade edges in sealing relation with the motor wall at all times, by quickly and easily installed means, which may readily be installed in different types of motors and are adapted to withstand extended periods of constant use, are accurate and reliable in service, may be installed at a relatively low cost, and require a minimum of servicing and adjustment.

The foregoing and other objects and advantages of the invention will become apparent in the course of the following description taken in conjunction with the drawings, forming a part of this specification, wherein.

Figure 2:
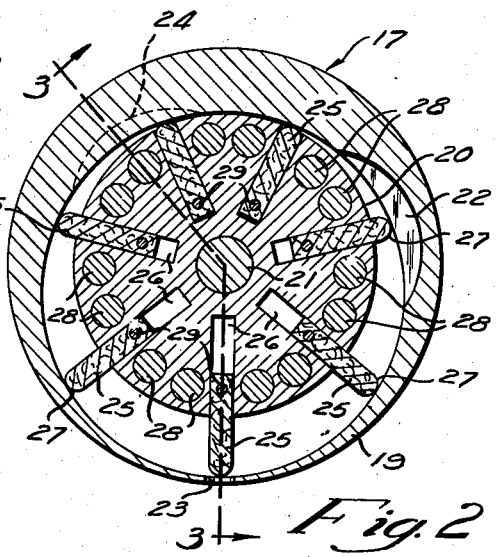
Fig. 2 is a transverse sectional view through the power tool motor taken on the line 2—2 of Fig. 1.
Figure 8:
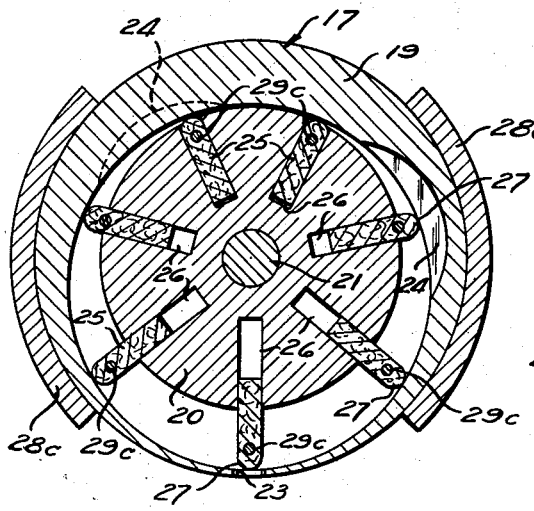
Figure 9:
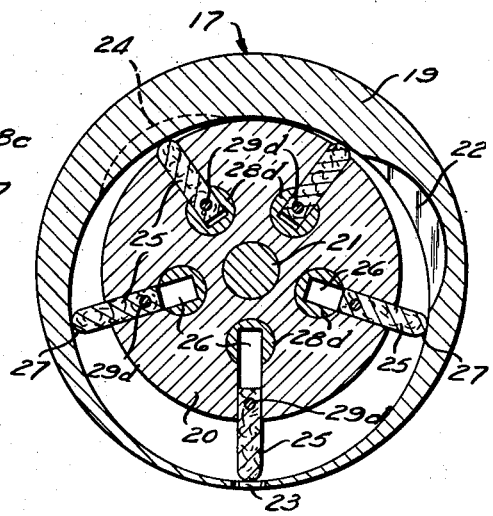

Fig. 8 is a sectional view thorugh the motor, corresponding generally to Fig. 2 and illustrating another modified form of the invention, wherein the magnets are mounted on the outside of the motor casing, while Fig. 9 is a sectional view through the motor, corresponding generally to Fig. 2, and illustrating still another modified form of the invention, wherein magnets mounted at the lower edges of the blades cooperate with magnets mounted in the rotor and disposed around the blade ends at their innermost position, to force the blades outwardly by magnetic repulsion force.

In brief, the embodiment of the invention, disclosed herein, discloses a pneumatic power tool for driving bolts, nuts, screws and the like, using a rotary pneumatic motor employing reciprocating blades retained in sealing relation with the motor wall by the centrifugal thrust of the motor as it rotates. Means in the form of the magnets, preferably permanent magnets, are utilized for constantly and automatically retaining the blade edges against the motor wall. The blades are formed of suitable non-magnetic materials such as fiber or similar material including nylon or the like, and have metal inserts incorporated in them, which are disposed within the magnetic fields of the magnets in such manner that the magnetic force of the magnets thrusts the blades against the motor wall. In most forms of the invention, the magnets are disposed in the rotor, while in one form of the invention the magnets are disposed along the outside wall of the stator, the magnetic action operating the blades in the foregoing forms being by attraction. In another form of the invention, the magnets are disposed at the inner edges of the blades where they force the blades outwardly by repulsion. Preferably the magnets used are of the permanent type.

Figure 1:
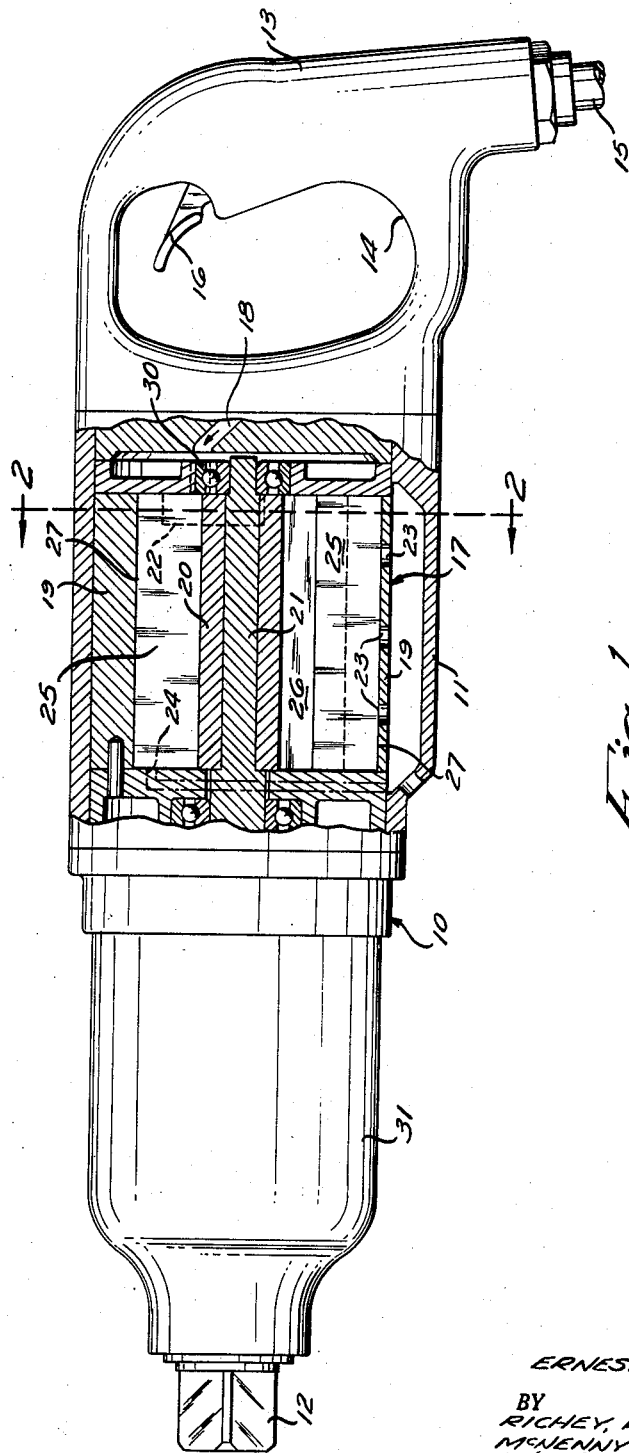
Fig. 1 is a side elevation view of a pneumatic power tool, with part broken away to illustrate the motor, illustrating an embodiment of this invention.

Referring to Fig. 1 the numeral 10 refers generally to a fluid-operated, power-driven power tool, of the type well known in the art for turning nuts, bolts, screws and the like. The tool 10 comprises an outer housing 11 having a work-applying head 12 adapted for turning work mounted on one end, while a convenient handle 13, mounted at the opposite end, and provided with an opening 14 for receiving the operator's hand while supporting the tool, is provided. Fluid under pressure is supplied to the tool 10 through a fluid supply conduit 15, adapted to be connected to a suitable source of fluid pressure and having one end operatively connected to the handle 13. An operating valve 16, adapted to be controlled by the operator's hand while it is inserted in the opening 14 of the handle 13, is provided for controlling the flow of fluid from the supply conduit 15 into a rotary fluid motor 17 through an inlet conduit 18.

Figure 3:
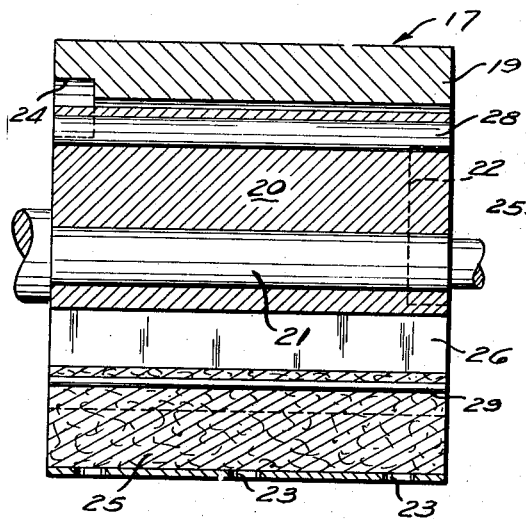
Fig. 3 is a sectional view through the motor taken on the line 3—3 of Fig. 2.

The embodiment of the invention disclosed in Figs. 2 and 3 comprises a rotary fluid-actuated motor 17 mounted in a stator 19, having a rotor 20 suitably mounted on a motor shaft 21 and eccentrically disposed within the stator 19, in accordance with conventional practice for rotary motors of this type. The stator 19 is provided with an inlet port 22, suitably connected to inlet conduit 18 for supplying fluid under pressure to the motor 17, while exhaust ports 23 and 24 in the stator 19 provide escape means for the fluid, as will be readily understood. A series of reciprocating blades 25, operating in radial slots 26 disposed in the rotor 20, are provided. The blades 25 are provided with rounded outer edges 27 and are formed of non-magnetic material, such as fiber, nylon or other materials which will withstand the various torsional stresses, strains and frictional actions to which blades are subjected in motors of this type.

When pneumatic motors, of the type disclosed herein, are operated at a relatively low speed, which is the condition in starting the motor or may be the normal operating condition of the motor, it frequently happens that there is not sufficient radial thrust action delivered to the blades 25 to securely press them against the motor wall to provide a tight seal at such point, hence there is considerable loss of pressure of the fluid along the blade edges resulting in relatively low motor operating efficiency.

In order to remedy the foregoing situation, I have provided a series of round bar magnets 28, suitably longitudinally embedded in the rotor 20 near the outer surface thereof, with their axes disposed parallel to the axes of the blades. Iron or steel round bars 29, suitably embedded in each blade 25 near the inner end thereof, and extending throughout the length of the blade, are disposed within the magnetic field of the pair of magnets 28 disposed nearest each blade 25, so that the attractive magnetic force of the magnets on the steel bars 29 embedded in the blades 25 constantly draws the blades 25 outwardly against the motor wall and securely retains the blades against the motor wall as the motor operates. Steel magnets of suitable size developing sufficient magnetic force to control the position of the blades may be used. Permanent magnets have been found satisfactory for such purposes. The amount of magnetic force required to be exerted by the magnets 28 to retain the blades 25 securely against the motor wall, of course, varies with different motors and operating speeds. Such magnetic force, however, should be ample to securely retain the blade edges in sealing relation to the motor wall at all times and under all operating conditions.

The motor 17, provided with suitable bearings 30, is suitably mounted within the tool housing 11 by means not shown herein, and is adapted to operate the work-applying head 12 to cause it to rotate and/or reciprocate through a clutch mechanism, not shown herein, disposed in a clutch housing 31. The construction and operation of a satisfactory clutch mechanism for performing the above operations is illustrated in U.S. Patent No. 2,715,889. Obviously, other driving mechanisms between the motor 17 and the work-applying head 12 may be used. The motor 17 is placed in operation by an operator moving the operating valve 16 to its operating position to cause fluid under pressure to flow through inlet conduit 18 and thence through inlet port 22 into an area between the motor wall and the rotor 20, causing the rotor 20 to operate in a clockwise direction, as viewed in the drawings.

Due to the eccentric disposition of the rotor 20 within the stator 19 and the slidable mounting of the blades 25 in the radial rotor slots 26, at one dead center portion each blade is pressed substantially completely into the rotor, while fluid under pressure is admitted into the spaces between the first two or three blades. As the rotor 20 turns each blade 25 passes the ends of the inlet ports, and as the blades continue to move outwardly the space between successive blades increases, permitting expansion of the compressed air which rotates the rotor 20. Shortly beyond the opposite dead center, the exhaust ports are opened with a final exhausting action occurring through exhaust port 24 just before the blades 25 are pressed to their inward position in the rotor 20. The general operation of a motor of this type is shown in U.S. Patent No. 2,715,889.

Figure 5:
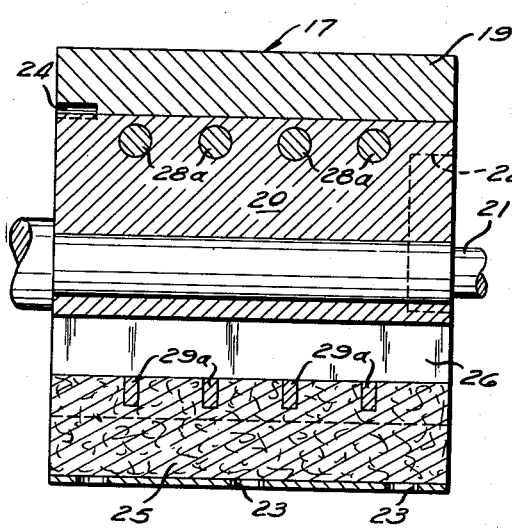
Fig. 5 is a sectional view taken on the line 5—5 of Fig. 4.
Figure 4:
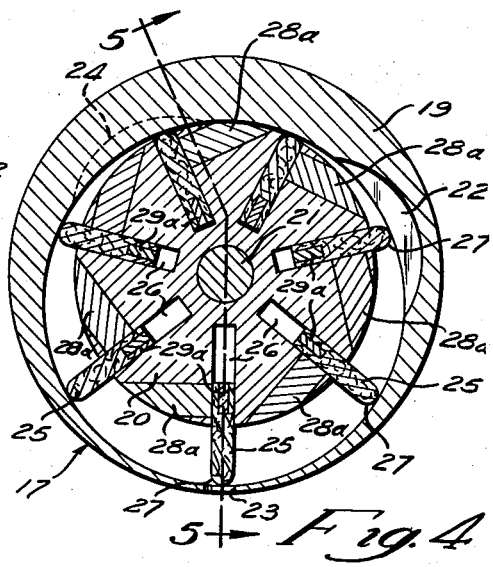
Fig. 4 is a sectional view through the motor, corresponding generally to Fig. 2 and illustrating a modified form of the invention.

The modified form of the invention disclosed in Figs. 4 and 5 as well as the subsequent forms differ from the embodiment of the invention disclosed in Figs. 2 and 3, principally in respect to the construction and arrangement of the magnets and cooperating steel insert members disposed in the blades, and hence similar reference numerals are used for the basic parts of the motor and tool, separate numerals being used to indicate the steel inserts and magnets disclosed in this and subsequent forms of the invention. In this form of the invention a series of short steel bars 29a are disposed transversely of the blades 25 at their inner ends, while a series of short round bar magnets 28a are disposed tangentially to the periphery of the rotor 20 with their inner ends disposed adjacent the outer ends of the radial blade slots 26. In this embodiment of the invention the attraction magnetic force of the bar magnets 28a is exerted on the steel bar inserts 29a to force the blades 25 against the inner wall of the motor in a manner similar to that described for the invention of Figs. 2 and 3.

Figure 7:
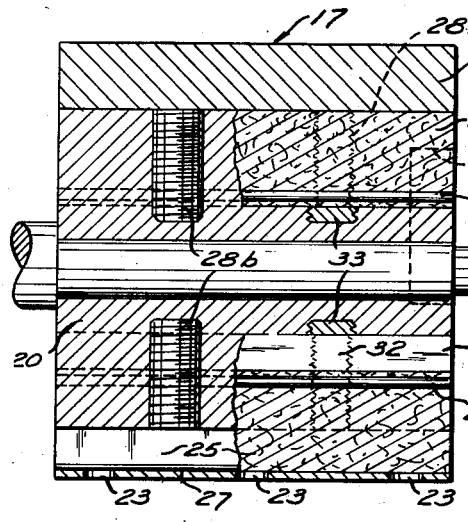
Fig. 7 is a sectional view taken on the line 7—7 of Fig. 6.
Figure 6:
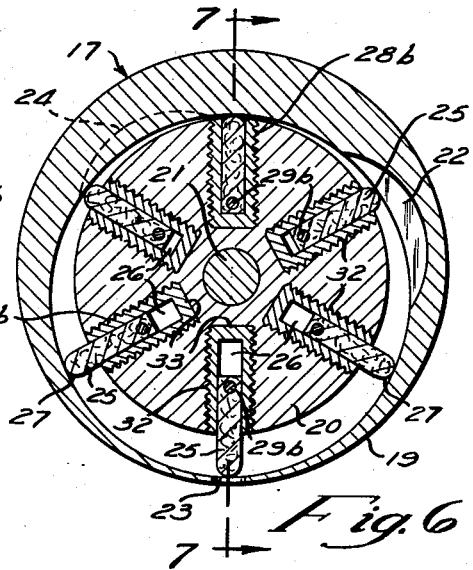
Fig. 6 is a sectional view through the motor, corresponding generally to Fig. 2 and illustrating another modified form of the invention employing horseshoe magnets.

The modified form of the invention disclosed in Figs. 6 and 7 includes a series of round steel bars 29b extending longitudinally of the blades 25 near the inner ends of the blades in a manner similar to the bars shown in Figs. 2 and 3. In this form of the invention a series of horseshoe magnets 28b, each including spaced legs 32 joined by connecting member 33, are radially disposed in the rotor 20 with one leg disposed on each side of the blade with the open end of the magnet disposed at the outer end of the rotor 20, the magnets 28b being threadedly mounted in the rotor 20. By the foregoing construction a magnetic field, created by the magnet 28b between the outer legs thereof, attracts the steel insert member 29b outwardly and thus forces the outer blade edges against the motor wall.

The modified form of the invention disclosed in Fig. 8 includes the use of a series of round steel bars 29c, extending longitudinally of the blades 25, and disposed near the outer ends of the blades. Magnetic attraction force is obtained in this construction by disposing arcuate-shaped bar magnets 28c suitably disposed along the outer wall of the stator 19 where such magnets, by attracting outwardly the steel insert bars 29c disposed at the outer ends of the blades 25, draw the blade edges against the motor wall. In this form of the invention the steel bars 29c are disposed at the outer ends of the blades 25 in order to be within the magnetic field created by the magnets 28c.

A further modified form of the invention, disclosed in Fig. 9, uses repulsion magnetic force, rather than attraction magnetic force as used in the other forms of the invention, to maintain the blade edges against the motor wall. Round steel bars 29d, extending longitudinally through the blades 25 near the inner ends thereof, are formed of permanent magnetic material, while permanent magnets 28d, disposed in the rotor 20 around the inner end of the blade slots 26, are of the same polarity as the inserts 29d. In this construction the permanent magnets 28d constantly repel the metal inserts 29d, due to the polarity of the two members being the same, and thereby retain the outer edge of the blades against the motor wall.

The magnetic means, disclosed herein, for forcing the slidable blade edges against the inner motor wall, may be used with modification on various motors other than the fluid-operated type disclosed herein. The particular type of magnet, adapted to be used for retaining the blade edges securely against the motor wall, depends on various features of the motor construction, such as the size, rate of rotation, size and type of blades and other factors. In adapting the invention for use on internal combustion engines using metal blades, a somewhat different application of magnetic action may be used, wherein the blades themselves may either be magnets or may be disposed within magnetic fields in a manner somewhat different from that disclosed herein.

For certain types of motors, it may be advantageous to use electromagnets, and the use of such magnets is within the contemplated scope of this invention. It will be apparent to those skilled in the art that the use of magneic force, either of the attraction or repulsion type, provides constant, automatic and uniform means for forcing the blade edges against the motor wall. Permanent magnets have been found to provide satisfactory magnetic force, under actual operating conditions, for relatively long periods of time.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. A fluid actuated motor comprising, a rotor mounted in a stator and provided with slidable blades of non-magnetic material adapted to seal against the inner motor wall by centrifugal thrust, said blades including metal material inserts capable of being moved by magnetic force, and magnetic means mounted on said rotor and positioned and arranged in such manner as to exert constant magnetic force on the metal material inserts of the blades forcing said blades outwardly against the motor wall.

2. A rotary pneumatic motor comprising, a rotor mounted in a stator and provided with slidable blades sealing against the inner motor wall by centrifugal thrust, said blades being formed of non-metallic material and being provided with metal members incorporated therein capable of being magnetically influenced for magnetically forcing said blades against the cylinder wall when the blades are disposed in their outward radial positions, and magnets disposed on said rotor in such manner as to create magnetic fields around said metal members, causing said blades to be constantly forced outwardly and securely retained against the motor wall by the magnetic action of said magnets on said metal members.

3. A fluid-operated motor comprising, a rotor mounted in a stator and provided with radial sliding blades adapted to seal on the wall of the motor, said blades being at least substantially formed of fiber material, metal inserts disposed in the inner ends of said blades and formed of a metal susceptible to magnetic influence for causing the blades to be forced against the inner motor wall by magnetic force, and permanent bar magnets disposed in said rotor adjacent said blades and positioned radially outwardly from the metal inserts when the blades are disposed at their inward positions in the rotor, whereby said magnets force said blades outwardly against the motor wall by magnetic attraction of said magnets.

4. In a pneumatic motor including a rotor provided with slidable blades sealing against the motor wall by centrifugal force, the improvement comprising means operating independently of the centrifugal thrust for constantly urging the blades against the motor wall including, members of magnetic metal disposed at the inner ends of said blades and extending longitudinally thereof, providing magnetically influenced means for attracting the blades to their outward position against the motor wall, and horseshoe magnets mounted in the rotor and disposed along said blades with the legs thereof disposed along the sides of the blades and a connecting member disposed across the lower blade edges, said magnets having their outer ends disposed adjacent the outer wall of the rotor, whereby the magnetic field created at the outer ends of said magnets draws said blades outwardly and forces the blades against the motor wall by magnetic attraction.

5. In a rotary motor of the type including a stator, a rotor operating therein and provided with reciprocably mounted blades sealing against the inner wall of the motor, the improvement comprising magnetic means for forcing the blade edges against the motor wall including, motor blades formed of a fiber material, a first magnet means located in said rotor at the inner ends of the blades when they are in their retracted position, a second magnet means disposed in said blades near the inner ends thereof, said first and second magnet means being of similar polarity and serving to force the blades radially outwardly against the motor wall by repulsion magnetic force.

6. A pneumatic motor including a rotor mounted in a stator and provided with radially slidable blades bearing against the stator, said blades being formed of non-magnetic material, inserts of magnetic metal disposed in said blades, and permanent magnets disposed in said rotor adjacent said blades and arranged to exert magnetic forces on said inserts to urge said blades radially outwardly against said stator.

7. A pneumatic motor including a rotor mounted in a stator and provided with radially slidable blades bearing against the stator, said blades being formed of non-magnetic material, inserts of magnetic metal disposed in said blades, and permanent magnets disposed in said rotor adjacent said blades with pole portions disposed on opposite sides of each of said blades and equally spaced from the inserts in said blades to exert magnetic forces on said inserts and urge said blades radially outwardly.

8. In a pneumatic motor including a rotor mounted in a stator and provided with slidable blades bearing against the stator, magnetic means for retaining the blade edges against the stator comprising, metal members capable of being magnetically influenced disposed in the inner ends of said blades, and permanent magnets disposed in the rotor adjacent said blades and positioned radially outwardly of the said metal members in the blades at least while the blades are disposed at their inner positions in the rotor, whereby said magnets exert an outward attraction magnetic force, constantly forcing the outer edges of the blades against the stator.

9. In a pneumatic motor including a rotor mounted in a stator and provided with slidable blades bearing against the stator, magnetic means for constantly forcing said blades against the stator by magnetic repulsion force comprising, a first magnet means disposed in the rotor around the inner ends of said blades at the innermost position of said blades, a second magnet means disposed in the inner end of each of said blades, said first and second magnet means being of the same polarity, whereby said blades are constantly thrust outwardly against the stator by magnetic force.

10. A fluid motor including a rotor mounted in a stator and provided with slidable blades of non-magnetic material arranged to slide and seal against the inner wall of said stator, each of said blades being provided with an insert of magnetic metal, and permanent magnet means secured to said motor and positioned radially outside of said inserts in such a manner as to urge said blades outwardly against said stator, said magnets being supported and maintained free of any rubbing engagement from the sliding of said blades against the inner wall of said stator.

References Cited in the file of this patent

UNITED STATES PATENTS

| | | |
|---|---|---|
| 1,884,584 | Cross | Oct. 25, 1932 |
| 1,914,091 | Hamilton et al. | June 13, 1933 |
| 2,135,881 | Wentworth | Nov. 8, 1938 |
| 2,249,059 | Stenger | July 15, 1941 |
| 2,588,342 | Bidwell | Mar. 11, 1952 |

FOREIGN PATENTS

| | | |
|---|---|---|
| 681,601 | France | Feb. 3, 1930 |